Jan. 11, 1944. J. S. SMYSER Re. 22,419

METHOD FOR MAKING ABRASIVE ARTICLES AND APPARATUS THEREFOR

Original Filed Feb. 7, 1924 2 Sheets-Sheet 1

Witness:
R. B. Davison.

Inventor:
James S. Smyser.
By Paul Carpenter Atty

Jan. 11, 1944. J. S. SMYSER Re. 22,419
METHOD FOR MAKING ABRASIVE ARTICLES AND APPARATUS THEREFOR
Original Filed Feb. 7, 1924 2 Sheets-Sheet 2
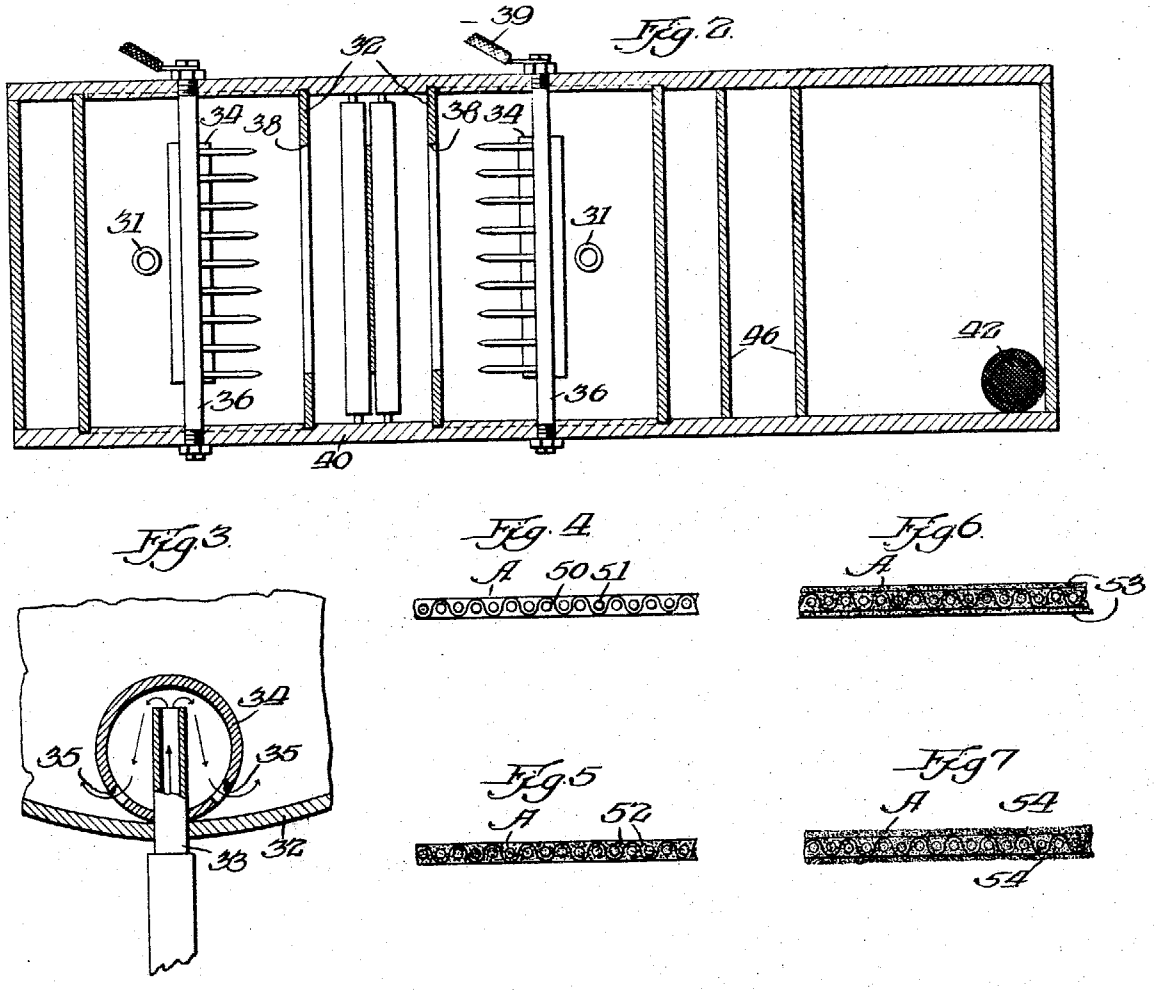
Witness:
R. B. Davison.
Inventor:
James S. Smyser.
By Paul Carpenter Atty Reissued Jan. 11, 1944 Re. 22,419

UNITED STATES PATENT OFFICE 22,419

METHOD FOR MAKING ABRASIVE ARTICLES AND APPARATUS THEREFOR

James S. Smyser, Boston, Mass., assignor to Minnesota Mining & Manufacturing Company, St. Paul, Minn., a corporation of Delaware Original No. 1,788,600, dated January 13, 1931, Serial No. 691,149, February 7, 1924. Renewed April 14, 1930. Application for reissue April 24, 1931, Serial No. 532,874.

59 Claims. (Cl. 117—17)

This invention relates to articles of manufacture consisting of a support, and a layer of comminuted material deposited thereon; and more particularly to producing and maintaining the physical union of the material and the support. The invention is especially useful in coating strips or sheets of fabric, paper or the like with abrasive particles as hereinafter described in connection with illustrative embodiment.

Objects of my invention are to provide a simple, and efficient method of producing an abrasive surface on a fabric or other article serving as a base, without materially affecting the flexibility or strength of the article; to provide an electrostatic method of continuously, and progressively producing an abrasive coating on a sheet of fabric, or other article, as it is moved in substantially the direction of its surface; to provide an improved coated fabric or other article; and generally to provide an improved method of and apparatus for producing an abrasive coating on an article.

In one aspect my invention contemplates electrostatically applying an abrasive coating to a fabric, or other article serving as a base, by electrostatically projecting abrasive particles into engagement or binding contact with the article being coated, and then forcing the engaged particles into more intimate engagement with the article.

In another aspect, an abrasive coating is electrostatically applied to an electrically non-conducting article by providing a conducting path extending over the article, applying a coating of binding material to the article, and bombarding the last applied coating by a stream of abrasive particles electrostatically charged oppositely to the conducting path of the article.

In still another aspect, the invention provides a fabric or other article coated with a conducting material having a superposed coating of binder material upon which there is deposited a coating of granular material.

The article, when in sheet form, may be coated by moving the sheet continuously in substantially the direction of its surface; dipping a portion of the sheet into a liquid bath having comminuted conducting material in suspension, to coat the sheet; drying the liquid from the coating to leave a conducting path over the surface of the sheet; making a sliding contact between the conducting portion of the sheet and one terminal of a source of electromotive force; dipping the sheet in a liquid bath of binding material to leave a coating of the binder on the sheet; equalizing the distribution of the binder coating on the sheet; moving the sheet through a stream of abrasive particles which are electrostatically charged by the source of electromotive force with a sign opposite to that of the conducting path of the sheet; equalizing the distribution of abrasive particles over the surface of the sheet, and forcing the particles into more intimate engagement with the sheet.

Methods and apparatus illustrating a species, of which my invention is a genus, are described more fully hereinafter in connection with the accompanying drawings, in which:

Fig. 2 is a plan of a portion of Fig. 1;

Fig. 3 is an enlarged view of a portion of Fig. 1;

Figs. 4, 5, 6 and 7 are cross sections of a fabric in successive stages, respectively, of the coating operations.

Figure 1:
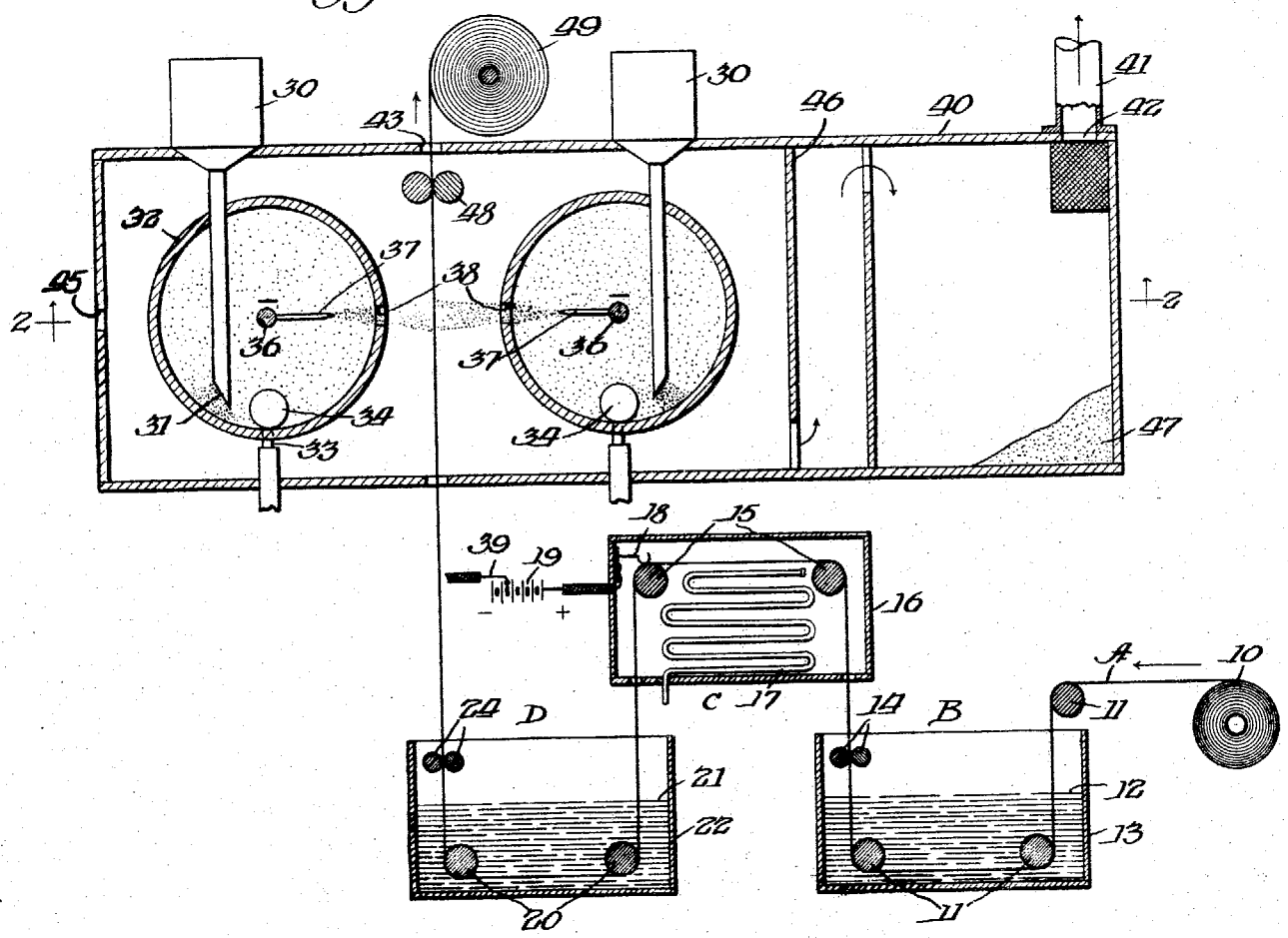
Fig. 1 is an elevation, in section diagrammatically showing apparatus for preparing an abrasive coating on a sheet of fabric.

In Fig. 1 the sheet A of fabric, paper, or similar material, is moved substantially in the direction of its surface and directed by rollers so that it passes continuously through a series of zones B, C, D and E, in each one of which the sheet is subjected to a different operation.

The sheet A feeds from the roll 10 in the direction indicated by the arrow into the coating zone B where it passes around rollers 11, and dips into the liquid bath 12 in tank 13, the liquid having in suspension granular or comminuted graphite or other conducting material. The liquid is preferably non-corrosive and without appreciable physical or chemical effect upon the sheet when used primarily to suspend the conducting particles; it may be water or other suitable liquid. The sheet passes between the rollers 14 which remove the excess of the mixture from the sheet, resulting in a substantially uniform distribution of conducting material throughout. The rollers 15 direct the sheet through a drying zone C within the chamber 16, having a heating element 17, such as a steam pipe, or other heater. The liquid upon drying from the coating on the sheet leaves the conducting material distributed over the surface as a conducting path. The brush 18 in contact with the sheet is connected to the positive terminal of the source of electromotive force 19 which electrifies the conducting path of the sheet with a charge of positive sign.

Rollers 20 direct the sheet through the zone D, in which, a coating of binding material is applied to the sheet as it dips into the liquid bath 21 of binding material, such as paraffin, or other suitable binder, preferably electrically non-conducting, in tank 22, heated by a steam pipe (not shown), or other suitable means. The rollers 24 remove the excess liquid and distribute the coating uniformly over the surface to equalize its thickness.

In the zone E, a coating of abrasive is electrostatically applied to the sheet. The hoppers 30 for containing abrasive particles of emery, carborundum, pumice, or other suitable abrasive material having the size of particle with which it is desired to coat the sheet, discharge through spouts 31 into the cylindrical electrifying chambers 32, preferably of electrically insulating material, disposed on opposite sides of the upwardly moving sheet. The nozzles 33 discharge air into the conduits 34 (see Fig. 3), these conduits having apertures 38 which admit the moving air at suitable pressure to the abrasive container 40 to produce a condition in which the abrasive particles are temporarily suspended in the atmosphere of the container into which the particles enter through orifices 38 into the zone of the electrical discharge, which takes place between the needles 37 mounted on bus-bars 36 and the conducting sheet.

Bus bars 36 are connected preferably to the negative terminal of source of electromotive force 19 by means of leads 39, the effective potential of the source 19 being adjusted to such a value, e. g. 18,000 volts, more or less, than the abrasive particles in chamber 32 become electrified with a negative charge, and together with the air admitted through nozzle 33 discharge through slot 38 as a stream of electrified particles which are electrostatically propelled toward the positively charged sheet A, the solid particles bombarding and coming into engagement with the binder coating on the sheet. It will be seen that the electrostatically propelled abrasive particles emerging from each of the orifices 38 become deposited as a thin blanket on the sheet A as it passes through the discharge zone.

The housing 40 for apparatus in the zone E prevents loss of the abrasive particles which fail to become attached to the sheet A, and is preferably constructed of insulating material. Conduit 41 is connected to an exhaust pump (not shown) and exhausts air from the housing 40 in the direction indicated by the arrow, the end of conduit 41 being covered by a screen 42 which sifts the abrasive particles from the air before entering the conduit. Air free from abrasive particles is admitted through openings 43, 44 and 45, thus tending to clarify the air within the housing and together with the air discharged through slots 38 causing a flow of the air and drift of the abrasive particles around the baffle diaphragms 46 as indicated by the arrows, the baffles tending to cause a precipitation of the particles at one end of the housing as indicated by the accumulation 47 which also includes the abrasive sifted by the screen 42. Owing to the reduced air pressure in housing 40 when air is exhausted through conduit 41, air may be fed through nozzles 33 directly from the atmosphere, but if a greater flow is desired compressed air may be fed through these nozzles.

Rollers 48 between which the sheet passes, after being coated with the abrasive, equalizes the distribution of abrasive material on the surface of the sheet and forces the abrasive particles into more intimate engagement with the sheet which then passes upward and is wound on the roll 49. The sheet may be propelled by rotation of the roll 49 or one or more of the rollers with which the sheet contacts between rolls 10 and 49.

Figure 4 shows the appearance of a simple fabric sheet A, of electrically insulating or poorly conducting material, having a warp 50 and a woof 51, before the sheet has entered the coating zone B. Fig. 5 shows the particles 52 of graphite or other conductor distributed over the surface of the fabric after the liquid from the batch 12 has been evaporated from the surface in the drying zone C and before the sheet has entered the coating zone D. Fig. 6 shows the sheet A with the coating 53 of paraffin, or other binding material, before the sheet enters the coating zone E. Fig. 7 shows the completed abrasive sheet having a coating 54 of abrasive particles distributed over the binder coating on each side of the sheet A.

By virtue of the electrostatic charges upon the abrasive particles as they pass to the fabric they are held apart by electrostatic repulsion and consequently are distributed far more effectively than is possible without the use of an electrostatic field. Thus the abrasive material may be deposited in any degree of depth, from an extremely thin deposit approximately one particle thick to a thick deposit, and in any case the particles are distributed with great uniformity. By coating the fabric upon both sides its usefulness is practically doubled and by virtue of the roughness of the rear side the article can be used more effectively with less danger of slippage in the fingers.

While certain materials have been mentioned in disclosing an example of how the invention may be carried out, it is to be understood that the materials specifically named are not necessary to the invention but may be replaced by other suitable materials. It is obvious that the sheet may be treated in the various zones B, C, D and E by various modifications of the apparatus disclosed within the knowledge of those skilled in the art.

The method, and apparatus disclosed for carrying out the method, permit of producing an abrasive coating on sheet fabric or other articles, particularly those in which it is desired to provide a certain degree of elasticity or flexibility, without objectionably stiffening the sheet or otherwise materially affecting those properties of the sheet which it is desired to preserve.

Owing to the more commonly elongated nature of abrasive particles, they tend to align themselves in the electrical field and are thus projected or bombarded against the adhesive coating with their longer dimension perpendicular thereto, thus permitting a nesting of the particles with respect to each other in the adhesive coating. Furthermore this permits of the adhesive coating exercising its capillary attraction, so that it will more readily rise along the sides of each individual abrasive particle and catch and hold additional particles subsequently applied before setting of the adhesive.

One of the inherent characteristics of the article produced by the improved method and apparatus disclosed herein resides in the fact that a major portion of the abrasive particles embed themselves in the adhesive coating and assume positions with their greater dimensions perpendicular or substantially perpendicular to the plane of the carrier, that is a sheet of fabric or paper as the case may be. Thus I am enabled to provide an abrasive article wherein the abrasive particles or grit may be applied in greater number to a predetermined area with a given quantity of adhesive than in the case of any other method or article known to me. I have, therefore, provided a new article of manufacture wherein the cutting edges or points of the abrasive particles are presented toward the surface to be abraded and materially enhance the efficiency of the abrasive article such as increasing its cutting ability and as well as its ability to keep clean.

I have found my improved method and apparatus peculiarly useful for the production of abrasive articles in view of the further following considerations. Abrasive particles present relatively sharper points or edges and, likewise, relatively less sharp portions. Where the particles are given an electrostatic charge, the density of the charge is greater at the points or edges than on any relatively more or less flat part of the surface of the particle. For this reason, the particle projected electrostatically aligns itself so that the sharpest point or edge points in the direction of the electrostatic field as it arrives at the adhesive coated surface. Inasmuch as I direct the electrostatic field I employ so that it acts perpendicularly to the surface coated with the adhesive, the particle acted upon so attaches itself to the adhesive surface as to present its sharpest cutting edge or point outwardly of the surface and in the direction of the electric field.

I am thereby enabled to produce an abrasive coating of extraordinary sharpness even with particles which are not necessarily markedly elongated, as well as when I employ the more common abrasive particles of an elongated contour. Thus I am enabled to attain an alignment of particles by means of an electrical field which affords a surface coated abrasive presenting the greatest number and most effective cutting points and edges known to me and one characterized by extraordinary cutting ability.

In the claims where I have referred to the abrasive particles being dispersed with major effectiveness for abrasively coating said backing, I mean to include the result produced in depositing grit or abrasive particles under the influence of an electrical field such as an electrostatic field to which effect I attribute a tendency to an orientation, positioning or displacement of the abrasive particles with the longer axes more or less perpendicular to the backing.

Reference is made to my divisional application Serial No. 640,978, filed Nov. 3, 1932, for Abrasive articles, wherein the article is claimed.

I claim:

1. Apparatus for applying coatings to electrically non-conducting sheet material, comprising means for feeding the sheet in substantially the direction of its surface, means for coating the moving sheet with a conducting material, means for applying a coating of binder material over said conducting coating, and means for electrostatically bombarding the binder coating with electrically charged particles to produce a coating upon said binder coating.

2. Apparatus for applying coatings to electrically non-conducting sheet material, comprising means for propelling the sheet substantially in the direction of its surface, means for applying to the sheet a coating of liquid having conducting particles in suspension, means for drying the liquid to leave conducting particles as a coating on the sheet, means for applying a coating of binder material to the sheet, and means for electrically projecting a stream of granular matter into engagement with the binder coating to apply a superficial coating to the sheet.

3. The method of electrostatically depositing a coating upon an article comprising agitating granular matter in the presence of an electric field, confining movements of the agitated particles to a restricted zone, and electrostatically projecting the electrified particles outwardly from the restricted zone to the object to be coated.

4. The method of preparing an abrasive coating on fabric or similar material, which comprises continuously moving the sheet in substantially the direction of its surface, progressively dipping the sheet in a liquid bath having finely divided conducting material in suspension, drying up the liquid left as a coating on the sheet and leaving the suspended particles deposited on the sheet to form a conducting path over the surface of the sheet, coating the sheet with a binder, equalizing the thickness of the binder coating, electrostatically projecting a stream of abrasive particles against the sheet, and forcing the abrasive particles into closer engagement with the sheet.

5. The method of preparing an abrasive coating on a sheet of fabric or similar material, which comprises moving the sheet substantially in the direction of its surface, dipping the sheet in a liquid bath having comminuted conducting material in suspension, drying up the liquid left as a coating on the sheet and leaving the suspended material deposited to form a conducting path over the surface of the sheet, dipping the sheet in a bath of liquid binding material, and electrostatically depositing a coating of abrasive particles on the binder.

6. The method of preparing an abrasive coating on a sheet of fabric or similar material, which comprises passing the sheet through a liquid having comminuted conducting material in suspension, withdrawing the sheet from the liquid and drying the liquid to leave a coating of conducting material on the sheet, coating the sheet with a binding material, and electrostatically projecting abrasive particles into engagement with the coating of binding material.

7. The method of preparing an abrasive coating on a sheet of fabric or similar material, which comprises coating the sheet with an electrically conducting material electrostatically projecting abrasive particles into engagement with the sheet and forcing the engaged abrasive particles into more intimate engagement with the sheet.

8. The method of preparing an abrasive coating on a sheet of fabric or similar material, which comprises continuously moving the sheet in substantially the direction of its surface, progressively coating the sheet with a liquid having comminuted conducting material in suspension, progressively drying the liquid to leave the suspended material as a conductive coating on the sheet, progressively coating the sheet with a binding material, and progressively bombarding the sheet with a stream of abrasive particles electrically charged oppositely to the conducting coating of the sheet.

9. The method of preparing an abrasive coating on a sheet of fabric or similar material which comprises continuously moving the sheet in substantially the direction of its surface, progressively depositing a conducting coating on the sheet, projecting a stream of abrasive particles electrified oppositely to the conducting coating into engagement with the sheet, and securing the engaged abrasive particles into more intimate engagement with the sheet.

10. The method of preparing an abrasive coating on an electrically non-conducting base, which comprises coating the base with an electrically conducting material, coating the conducting material with a binding material, and electrostatically projecting a stream of abrasive particles into engagement with the binder coating.

11. The method of making an abrasive article which comprises rendering a sheet of fabric or the like both conductive and adhesive and by oppositely charging the conductive sheet and comminuted abrasive material adjacent thereto, electrostatically depositing a layer of said material upon the adhesive surface thereof.

12. The method of coating a sheet of material with abrasive particles which comprises rendering the sheet both conductive and adhesive and, by oppositely charging the conductive sheet and abrasive particles in the region of the sheet, electrostatically depositing the abrasive particles upon the adhesive surface of the sheet.

13. The method of coating a sheet of material with abrasive particles which comprises rendering the sheet both conductive and adhesive, continuously agitating a supply of abrasive particles in an enclosed region, continuously feeding the sheet along a path associated with said region, and by oppositely charging the conductive sheet and abrasive particles in said region electrostatically embedding the particles upon the adhesive surface of the sheet.

14. Apparatus for applying adhesive material to an electrically conducting surface and depositing thereon finely divided particles under the influence of an electrostatic field, comprising means for moving the surface in substantially the direction of its length, means for applying adhesive material to the surface, and means for electrostatically bombarding the adhesive material with electrically charged particles to produce a coating upon said adhesive material.

15. Apparatus for applying finely divided particles to a surface previously rendered electrically conducting and adhesive, comprising means for producing an electrostatic field in a region containing finely divided particles and means for moving the surface through said electrostatic field.

16. The method of electrostatically depositing finely divided material particles upon an article, which comprises establishing an electrostatic field, dispersing the finely divided material particles to form a suspension in a region containing the electrostatic field, confining movements of said particles to a restricted zone and electrostatically projecting them to the article to be coated.

17. The method of spreading an abrasive coating on a sheet of fabric or similar material which comprises treating the sheet to render it electrically conductive and mechanically adhesive, establishing an electrostatic field of force between the surface to be coated and a charged conductor of opposite polarity to that of the sheet and adjacent thereto, conveying finely divided abrasive particles into the electrostatic field of force and moving the surface progressively and in substantially its own plane through the electrostatic field of force whereby the abrasive particles may, by the action of the electrostatic field of force upon them, be deposited thereon.

18. The method of spreading a coating of finely divided particles on a sheet of fabric or similar material which comprises treating the sheet to render it electrically conductive and mechanically adhesive, establishing an electrostatic field of force between the surface to be coated and a charged conductor of opposite polarity to that of the sheet and adjacent thereto, conveying the finely divided particles into the electrostatic field of force, and moving the surface progressively and in substantially its own plane through the electrostatic field of force whereby the finely divided particles may, by the action of the electrostatic field of force upon them, be deposited thereon.

19. Apparatus for depositing finely divided particles on the surface of a fabric or other material comprising means for treating the fabric to render it electrically conductive and mechanically adhesive, means for establishing an electrostatic field of force between two electrodes of opposite polarity one of which is in electrical contact with the surface of the fabric, means for conveying the finely divided particles into the electrostatic field of force where, under its influence, they will be deposited on the surface of the fabric, and means for progressively moving said surface in substantially the direction of its length.

20. Apparatus for depositing finely divided abrasive particles on the surface of a fabric or other material comprising means for treating the fabric to render it electrically conductive and mechanically adhesive, means for establishing an electrostatic field of force between two electrodes of opposite polarity one of which is in electrical contact with the surface of the fabric, means for conveying the finely divided abrasive particles into the electrostatic field of force where, under its influence, they will be deposited on the surface of the fabric, and means for progressively moving said surface in substantially the direction of its length.

21. The method of coating, with pulverized material, a surface that is both electrically conductive and mechanically adhesive comprising establishing an electrostatic field of force between two electrodes of opposite polarity one of which is in electrical contact with the surface to be coated, conveying the pulverized material into the electrostatic field of force under the action of which it will be translated to the surface to be coated, and subjecting successive parts of the surface to the combined action of the electrostatic field of force and the pulverized material in a manner that will be substantially continuous.

22. The method of coating, with finely divided abrasive material, a surface that is both electrically conductive and mechanically adhesive comprising establishing an electrostatic field of force between two electrodes of opposite polarity one of which is in electrical contact with the surface to be coated, conveying the finely divided abrasive material into the electrostatic field of force under the action of which it will be translated to the surface to be coated, and subjecting successive parts of the surface to the combined action of the electrostatic field of force and the finely divided abrasive material in a manner that will be substantially continuous.

23. The method of spreading a coating of finely divided material upon an electrically conductive surface, which comprises establishing an electrostatic field of force between two electrodes of opposite polarity, one of which is in electrical contact with the surface to be coated, conveying the finely divided material into the electrostatic field of force under the action of which it will be translated to the surface to be coated, and bonding the finely divided material to the surface to be coated.

24. In the manufacture of abrasives, the improved method which consists in providing a carrier having a surface coated with an adhesive, depositing finely divided abrasive material upon said surface and dispersing the particles by the action of an electrical field as they are being deposited upon the surface.

25. In the manufacture of abrasives, the improved method which consists in depositing abrasive particles upon a carrier surface, providing an adhesive material for retaining the particles on the carrier, and dispersing the particles by the action of an electrical field as they are applied to the carrier.

26. In the manufacture of abrasives, the improved method which consists in providing a carrier having a surface coated with an adhesive, depositing finely divided nonmagnetic abrasive material upon said surface and dispersing the particles upon the surface by the action of an electrical field.

27. In the manufacture of abrasives, the improved method which consists in providing a carrier having a surface coated with an adhesive, directing abrasive particles toward said adhesively coated surface, and controlling the position of the particles relative to one another on the carrier by an electrical field.

28. In the manufacture of abrasives, the improved method which consists in providing a carrier having a surface coated with an adhesive, directing abrasive particles toward said adhesively coated surface, and controlling the position of the particles relative to one another in their path to the carrier and on the carrier by an electrical field.

29. Apparatus for the manufacture of abrasives, comprising means for supporting a carrier having a surface coated with an adhesive adapted to receive and retain abrasive particles, means for supplying abrasive particles and directing the same toward said surface, and an electrical field disposed in the path of said particles so as to control the arrangement of the same relative to one another at the time they are deposited upon the carrier.

30. In the manufacture of abrasives the improved method of depositing abrasive particles upon a carrier surface which includes providing an adhesive material for retaining the particles on the carrier and projecting the particles substantially longitudinally of their axes by the action of an electric field as they are applied to the carrier.

31. In the manufacture of abrasives the improved method of depositing particles upon a carrier surface which includes providing an adhesive material for retaining the particles on the carrier, forming a suspension of said abrasive particles in a defined zone, and projecting particles from said zone onto the carrier by the action of an electrical field.

32. In the manufacture of abrasives the improved method of depositing particles upon a carrier which includes providing an adhesive material for retaining the particles on the carrier and projecting the particles onto the carrier by the action of an electrical field independently of mechanical pressure.

33. In the manufacture of abrasives, the improved method of depositing particles upon an adhesive carrier which includes moving the particles into adhesive engagement with the carrier in spaced relationship to each other the deposition being effected under the influence caused by the action of electrical force creating an electrical field affecting the spaced relationship of the particles aforesaid.

34. In the manufacture of abrasives, the improved method of depositing particles upon an adhesive carrier which includes moving the particles into adhesive engagement with the carrier in substantially a single layer the deposition being effected under the influence caused by the action of electric force creating an electrical field affecting the particles in the movement aforesaid.

35. In the manufacture of abrasives, the improved method of depositing particles on an adhesive carrier which consists in moving the particles into adhesive relation with the carrier, the deposition being effected under the influence caused by the action of electric force creating an electrical field affecting the particles in the movement aforesaid.

36. In the manufacture of abrasives, the improved method of depositing particles of elongated character thereby having different degrees of effective cutting portions upon a carrier which includes providing an adhesive material for retaining the particles on the carrier and projecting the particles onto the carrier, the deposition being effected under the influence caused by the action of an electrical field acting perpendicular to the surface of the carrier whereby they are deposited on the carrier with their major effective cutting portions in the direction of the electrical field.

37. In the manufacture of abrasives, the improved method of depositing the abrasive particles upon a carrier surface which includes providing an adhesive material for retaining the particles on the carrier and projecting the particles onto the carrier by the action of an electrical field established by a high potential.

38. In the manufacture of abrasives, the improved method of depositing particles upon a carrier which includes providing an adhesive material for retaining the particles on the carrier and projecting the particles onto the carrier by the action of an electrical field and controlling the quantity of the particles deposited on the carrier by variation in the quantity of the particles brought within the electrical field.

39. In the art of making flexible abrasives, the provision of a continuously flexible carrier web, applying a hardenable adhesive material to said carrier web, progressively feeding said carrier web while the adhesive is soft and receptive into the presence of a supply of pulverulent abrading material, activating the abrading material adjacent to the carrier to form an extended arrangement of particles, and impressing an electrical field on such activated abrasive material for moving it onto the carrier with the major portion of the individual particles thereof having their longitudinal axes substantially perpendicular to the carrier web.

40. In the art of making flexible abrasives, the provision of a continuously flexible carrier web, applying a hardenable adhesive material to said carrier web, progressively feeding said carrier web while the adhesive is soft and receptive into the presence of a supply of pulverulent abrading material, activating the abrading material adjacent to the carrier to form an extended arrangement of particles, directing the thus activated particles into a predetermined zone adjacent to said carrier web, and impressing an electrical field on the thus activated abrasive particles for moving them into intimate adhesive engagement with the carrier web.

41. In the manufacture of abrasives, the improved method which consists in providing a carrier having a surface coated with an adhesive, depositing finely divided abrasive material upon said surface by an electrical field, the particles being thereby held apart and consequently more effectively distributed as they are deposited upon said surface carrying said adhesive.

42. In the manufacture of abrasives, the improved method which consists in providing a carrier having a surface coated with an adhesive, coating the adhesive surface with the abrasive by passing the abrasive particles to the carrier and holding them apart by an electrical field whereby they are projected onto the carrier in spaced relationship relatively to each other.

43. An apparatus for the manufacture of coated carriers comprising means for supplying a controlled feed of finely divided solid material adapted to be dispersed by an electrical field, means for supporting an adhesively surfaced carrier to be coated, and means for producing an electrical field to disperse the individual particles of finely divided material upon said adhesive surface as the material is supplied thereto.

44. An apparatus for the manufacture of coated carriers comprising means for supplying a controlled feed of finely divided solid material adapted to be dispersed by an electrical field, means for supporting and causing to travel adjacent said supply means an adhesively surfaced carrier to be coated, and means for producing an electrical field to disperse the individual particles of finely divided material upon said adhesive surface as the material is supplied thereto.

45. In the manufacture of abrasives, the improved method which consists in providing a carrier having a surface coated with an adhesive, depositing finely divided abrasive material upon said surface and through the medium of an electrical field controlling the arrangement of the abrasive particles on the adhesive surface to cause the same to be substantially uniformly oriented with their major axes at substantially right angles to the adhesively coated carrier surface.

46. The process of making abrasive material which includes the step of depositing abrasive particles upon an adhesively coated backing, dispersing the individual particles and orienting them with major effectiveness for abrasively coating said backing by means of an electrical field.

47. The process of making abrasive material which includes the step of depositing abrasive particles upon an adhesively coated backing, dispersing and holding the individual particles apart whereby orientation thereof is accomplished with major effectiveness for abrasively coating said backing by means of an electrical field.

48. That step in the manufacture of abrasives to adhesively unite the abrasive to a carrier which comprises depositing finely divided abrasive material upon a carrier and through the medium of an electrical field controlling the arrangement of the abrasive particles on the carrier to cause the same to be substantially uniformly oriented with their major axes at substantially right angles to the carrier.

49. In the manufacture of abrasive including adhesively united abrasive particles forming an abrading surface, the step which comprises depositing finely divided abrasive particles and through the medium of an electrical field controlling the arrangement of the abrasive particles to cause the same to be substantially uniformly oriented with their major axes substantially at right angles to said surface.

50. In the manufacture of abrasives, the improved method which consists in providing a carrier, directing abrasive particles toward said carrier, controlling the position of the particles relative to one another in their path to the carrier by an electrostatic field and varying the relative positions of the particles in said path by adjusting the electrical field to such a value as to electrostatically propel the particles as desired.

51. A method of applying a finish to an article of manufacture, consisting in producing a uni-directional current of high voltage in an atmosphere, introducing a coating material in a finely divided form into the atmosphere, and subjecting the article of manufacture to be coated to the current and the atmosphere for a predetermined period of time to cause electrical deposition of the material upon the article of manufacture.

52. A method of applying a finish to an article of manufacture, consisting in enclosing a space of predetermined size, introducing into the enclosed atmosphere a coating material in a finely divided form, conveying the article of manufacture to be coated through the enclosed atmosphere, and subjecting the article of manufacture and the coating material to a difference of electrical potential to cause the coating material to be deposited on the article of manufacture.

53. The method of making sandpaper and other products coated with elongated particles which comprises separating elongated particles into a separated and temporarily suspended condition from a bulk source of supply by a force applied to said particles fed from said source, then iintroducing the particles so separated and suspended into a position between an impelling force comprising an electrical field and an adhesive coated backing, the particles thereby being presented into the position aforesaid to permit the particles to alter their position in respect of each other and then causing the particles to adhere substantially normally to the backing by the application of the electrical impelling force to said particles so introduced in the condition aforesaid.

54. The new article of manufacture comprising apparatus for forming a coating of abrasive and other pulverulent elongated particles upon an adhesively coated surface which includes, in combination, a hopper for said particles, and means acting upon the particles fed from said hopper causing the particles to be arranged in a separated and temporarily suspended condition, said means including additional means directing said particles towards said surface and which confines the movement of the particles within a zone ineffective alone to coat the surface towards which said particles have been directed by said means, and comprising an electrical field for impelling said particles from said zone against said adhesively coated surface to cause adhesion of said particles substantially normally to said surface.

55. The method of coating, with finely divided material, an article which is electrically conductive and has a mechanically adhesive surface comprising establishing an electrostatic field of force between two electrodes of opposite polarity, one of which is in electrical contact with the surface to be coated, introducing finely divided material into the electrostatic field of force under the action of which it will be translated to the surface to be coated and subjecting the surface to the combined action of the electrostatic field of force and the finely divided material for sufficient time to enable it to be substantially uniformly coated.

56. In the manufacture of an article having a coated surface, the improved method which consists in providing a carrier with an adhesive surface, introducing into the region of the adhesive surface, a finely divided coating material, depositing and arranging the finely divided coating material upon the adhesive surface by the action of an electrical field.

57. In the manufacture of articles having coated surfaces, the improved method of arranging finely divided material upon a surface which is mechanically adhesive, which comprises establishing an electrical field between electrodes of opposite polarity, disposing the surface to be coated within said field, introducing into the region of the adhesive surface a finely divided coating material, and projecting by means of the field against the surface the particles substantially longitudinally of their axes.

58. The method of applying a finish to an article of maufacture, consisting in producing an electrical field of high voltage in an atmosphere, introducing a coating material in a finely divided form into the atmosphere and subjecting the article of manufacture to be coated to the electrical field and the atmosphere for a predetermined period of time to cause electrical deposition and arrangement of the material upon the article of manufacture.

59. The method of applying a finish to an article of manufacture, consisting in enclosing a space of predetermined size, introducing into the enclosed atmosphere a coating material in a finely divided form, subjecting the article of manufacture to be coated to the enclosed atmosphere, and subjecting the article of manufacture and the coating material to a difference of electrical potential to cause the coating material to be deposited on the article of manufacture.

JAMES S. SMYSER.